A. KRUS.
HAND PRESS AND BOTTLE CAPPING APPARATUS.
APPLICATION FILED FEB. 21, 1921.
1,400,556.
Patented Dec. 20, 1921.
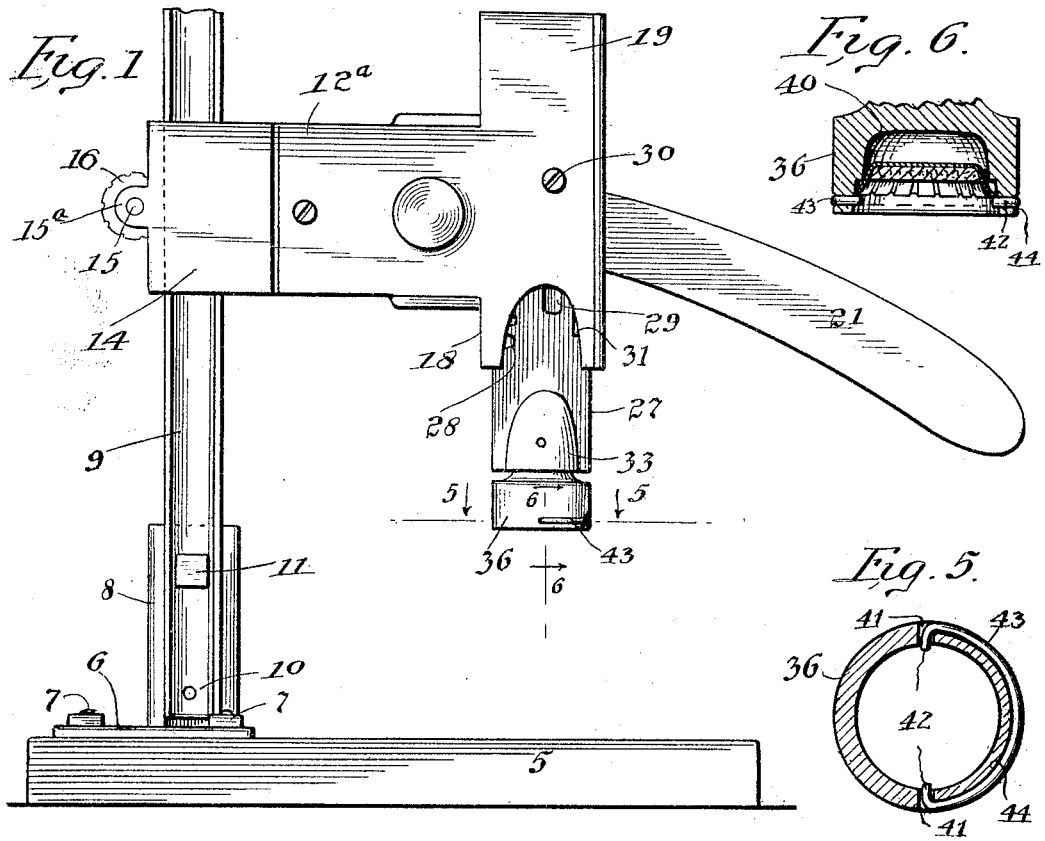
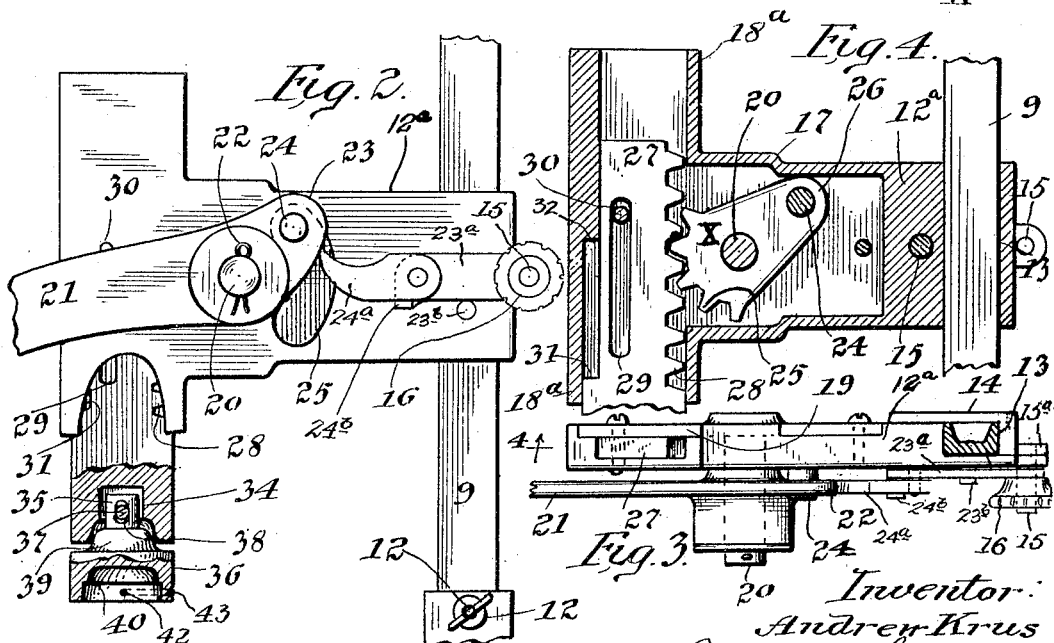
Inventor:
Andrew Krus

UNITED STATES PATENT OFFICE.

ANDREW KRUS, OF CHICAGO, ILLINOIS.

HAND-PRESS AND BOTTLE-CAPPING APPARATUS.

1,400,556.  Specification of Letters Patent.  Patented Dec. 20, 1921.

Application filed February 21, 1921. Serial No. 446,626.

*To all whom it may concern:*

Be it known that I, ANDREW KRUS, a citizen of the United States, residing at Chicago, in the county of Cook and State of Illinois, have invented a new and useful Improvement in a Hand-Press and Bottle-Capping Apparatus, of which the following is a specification.

My present invention relates to the provision of a device for use for purposes where the application of a certain amount of power is required, and especially to a hand press for holding work or in connection with the sealing and corking bottles, or containers capable of receiving closures secured thereon by pressure.

In particular, my present invention has reference to an apparatus of this character that is operated manually, and which is portable so that it may be readily used in households, or other places where power is not usually available for the running of machinery, although it will be understood that by slight modifications the principles of my invention may be readily adapted for use in structures operable by the application of steam, electric or other power.

In order to secure a device which will operate with the least trouble and the least amount of breakage with the power available with a hand operated machine, I have found that it is necessary to provide facilities for capping or corking a bottle whereby the cork or cap is driven home with a comparatively slow, steady pressure, ample for the purpose, and not by means of a blow or other quick action often resorted to where the power available is limited, which is liable to break the container. I have also found that it is desirable to provide facilities whereby the cap is brought squarely down upon the mouth of the bottle as the development of an uneven pressure upon the edges or lips of the neck or mouth is liable to chip them and unfit the bottle for further use with a seal. Where the power is ample and its application steady and uniform around the lips of the container, I have found that besides eliminating breakage I secure a more perfect sealing of the container. I have also provided simple and inexpensive means for retaining the caps or seals in the capping die until they are crimped on the container, as it is much quicker and more convenient to insert the seals or caps into the die than to place them on the bottles preparatory to compressing them in place. The same facilities which are provided for capping a bottle are well applicable for a hand press wherein it is desired to compress and retain under pressure articles being operated on in divers manners. Further provision is made whereby the operating mechanism may be retained in a locked position after the articles have been compressed. Other objects consists in the provision of an apparatus of this character that is novel in construction, and made of a minimum of parts so that they may be arranged in a compact manner; are simple in construction and easy to assemble, and may be placed upon the market at a reasonable price. All of the foregoing objects and others I prefer to accomplish in substantially the manner hereinafter described, and as more particularly pointed out in the claims. Reference will now be had to the accompanying drawings that form a portion of this specification, in which—

Figure 1 is a vertical side elevation of my improved hand press and bottle capping apparatus.

Fig. 2 is a view similar to Fig. 1 showing the opposite side of the structure, portions of the standard and the operating handle or lever being broken away.

Fig. 3 is a top plan view of the structure illustrated in the preceding figures.

Fig. 4 is a vertical sectional view taken on line 4—4 Fig. 3, some of the parts being shown in elevation for clearness.

Fig. 5 is a section through the capping die on line 5—5, Fig. 1, showing the means for retaining the cap in the die prior to its compression upon the container, and Fig. 6 is a vertical section of the die on line 6—6, Fig. 1.

In the drawings, I have employed similar reference numerals to designate the same parts throughout the several views, and by reference to Fig. 1, it will be observed the structure preferably comprises a suitable base 5 of such shape and size as to provide a platform below the capping die to receive the bottle and also to provide a suitable support upon which a foot-plate 6 may be securely mounted by means of bolts and nuts 7. Arising from this foot-plate 6 is a suitable upright socketed arm, the socket 8 of which is substantially U-shape in section so that it is adapted to receive between its flanges a length of channel iron 9 that provides a standard upon which the operating parts are adjustably carried. I prefer to mount this standard 9 with the web of the channel against the web of the U-section socketed arm 8 and the flanges thereof against the flanges of the socketed arm. A dowel pin 10 projects from the web of the standard and extends into and through an alining opening in the web of socket or arm 8, and a square headed bolt 11 is inserted through alining apertures in the web of upright member 8 and channel 9, the extended end of the bolt being threaded to receive a wing nut 12 which is adapted to be screwed thereon to clamp the standard rigidly in a vertical position in socket or arm 8.

Adjustably mounted upon standard 9 is the carrier which supports and incloses the operating mechanism for the capping die. This carrier preferably comprises a casting of substantially T-shape, the stem 12$^a$ of the T having a transverse recess 13 to receive standard 9 to which it is clamped by means of a clamping plate 14 secured in place by a bolt 15 passing through alining lateral ears on the ends of stem 12$^a$ of the T and said clamping plate, the extended portion of the bolt having screwed thereon an enlarged nut 16, which, as shown in the drawings, is longitudinally grooved to permit it to be firmly grasped by the hand of the operator to tighten or loosen the clamping plate when it is desired to adjust the carrier to different positions, up and down upon the standard. The remaining portion of the carrier is hollowed to provide a peripheral flange 17 to inclose a portion of the mechanism, and lateral arms 18 of the T-shaped carrier are similarly hollowed to provide flanges 18$^a$ that act as guides for the capping plunger.

A suitable plate 19 of substantially T-shape covers the hollowed portions of the carrier, and projecting inwardly from the inner face of this plate is a stud 20 that passes through the wall of the carrier and has loosely journaled thereon the operating handle or lever 21 that is retained in position by a cotter-pin 22. An extension 23 is provided upon the end of the handle beyond the hub or boss thereof surrounding stud 20, and in the end of this extension is rigidly mounted a transverse pin 24. This pin passes through a segmental slot 25 in the adjacent portion of the wall of the carrier plate to permit of its engagement with the operating mechanism that is inclosed in the carrier. Mounted loosely upon stud 20 inside the carrier is a disk-like plate X, the edge whereof is concentrically shaped and provided with teeth to form a segmental gear 25, while the opposite portion of the disk is provided with an extension 26 which is provided with an aperture through which pin 24 passes, and by which the segmental gear is actuated through the medium of the lever or handle 21 and its extension 23.

For the purpose of securing the handle in a position after having compressed articles under the plungers, I have provided a latch mechanism, which comprises a latch-bar 23$^a$ one end whereof is apertured whereby it is mounted on bolt 15 between the nut 16 and the adjacent lug 15$^a$ and rests intermediate its ends upon a pin 23$^b$. Hingedly secured to the opposite end of latch-bar 23$^a$ is a pawl 24$^a$ of horn-shape, the upwardly extended apex of which engages the adjacent edge of extension 23 of the lever or handle 21. A lateral lug 24$^b$ extends from the lower edge of latch bar 23$^a$ below the adjacent portion of the pawl and provides a shelf that supports the pawl in desired position and prevents the pawl swinging down on its pivot when its engaging end operates against extension 23. When not in use, pawl 24$^a$ may be swung over on the opposite side of the pivot where it will be out of the path of movement of extension 23, but when in the position in Fig. 2, any reverse movement of the handle to return it to normal position after compressing the article under the plungers is halted by the apex of pawl 24$^a$ biting into or wedging against the adjacent edge of extension 23. Upon releasing the pawl the handle may be moved upwardly again.

Slidably mounted between the walls of arms 18 of the carrier is the capping plunger which is preferably an elongated bar 27 of substantially rectangular cross-section that has, upon its edge adjacent the segmental gear, a plurality of rack teeth 28 that mesh with the teeth of said segmental gear. An elongated slot 29 is made in the upper portion of this plunger 27 that is engaged by a stop-pin 30 passing through the same and through the adjacent portions of the carrier walls. Also a shoulder 31 is made upon plunger bar 27 opposite rack 28 that limits the upward movement of the plunger by engagement with a stop or shoulder 32 formed in flange 18$^a$ of the carrier-wall.

It will be seen from the foregoing that the reciprocation of handle or operating lever 21 upon its stud 20 will move the segmental gear 25 through the medium of pin 24 engaging extension 26 of said gear plate, and this movement of the gear reciprocates the capping plunger, and that a novel leverage principle is involved in this operation which provides ample power and a steady and relatively slow movement for seating the cap and compressing the edges about the mouth of the container.

The lower end of the plunger has an embossment 33 which increases the transverse dimensions of the end of the plunger, and a cylindrical recess 34 is made upwardly into the end of the enlarged portion of the plunger to receive the stud or projection 35 of a suitable block or die 36 that is secured therein by means of a transverse pin 37 that passes through the head of the plunger and through an elongated slot 38 in extension 35. The block or die 36 is provided with a somewhat spherical or conical embossment 39 upon its upper portion from which extension 36 projects, which embossment permits the die to come squarely down upon the article, and when used as a bottle capper the lower end or underneath portion of the die is recessed, as at 40, to perform the crimping or clamping operation upon the cap or seal. The lower portion of recess 40 in the capping die is enlarged to receive the crimped edge portion of the cap which is extended before it is crimped about the mouth of the container, and to retain the cap in the die before it is crimped upon the container I have bored the lower portion of the die at diametrically opposite points 41 to receive the inwardly turned ends 42 of a semi-circular spring 43, the inwardly turned ends whereof extend sufficiently far into the bore of the die to engage the extended crimped edges of the cap before it is compressed about the container. The outer portions of bores 41 may be connected by means of a semi-circular slot 44 to receive the semi-circular portion of spring 43 so as to inclose it and prevent its accidental displacement.

The manner of connecting the capping die and of relating it to the adjacent portion of the plunger permits of the removal of the capping die for the purposes of replacement.

What I claim new is:

1. A capping machine comprising a standard, a carrier mounted thereon, a capping plunger reciprocable in said carrier having a rack upon one edge, a gear meshing with said rack and having an extension, an operating lever separate from said gear having a portion extended beyond its fulcrum, and means connecting the extensions of said lever and gear.

2. A capping machine comprising a standard, a carrier mounted thereon, a capping plunger reciprocably mounted within said carrier and guided thereby, a rack upon one edge of said plunger, a segmental gear mounted within said carrier in mesh with said rack, an extension on said gear opposite the teeth thereof, an operating lever separate from said gear fulcrumed on said carrier and having a portion extended beyond its fulcrum, and a pin operatively connecting the extensions of said lever and gear.

3. A capping machine comprising a standard, a carrier mounted thereon, a capping plunger reciprocable in said carrier having a rack upon one edge, a stud extending through said carrier, a gear mounted upon said stud within said carrier and meshing with said rack, an operating lever separate from said gear fulcrumed on said stud and having an extension beyond its fulcrum, a member projecting from said gear, and a pin operatively connecting said member and the extension of said lever.

4. A capping machine comprising a standard, a carrier mounted thereon, the walls of said carrier being spaced to provide a suitable housing, a plunger reciprocable vertically in said housing and having its lower portion extended outside thereof, a rack upon one vertical edge of said plunger, a segmental gear journaled within said housing in mesh with said rack, a transverse stud upon which said gear is journaled and one end whereof extends through said housing, an extension projecting from the side of said gear opposite the teeth thereof, an operating lever separate from said gear journaled on the extended portion of said stud and having an arm projecting away from said lever, and a transverse pin passing through a segmental slot in said housing and operatively connecting said arm and the extension of said gear.

5. A capping machine comprising a standard, a carrier of substantially T-shape the stem of which is adjustably connected to said standard whereby the transverse arms thereof are disposed vertically, said carrier consisting of oppositely disposed walls suitably spaced to provide a housing, a stud projecting from one of said walls through the opposite wall, a lever of the first-class loosely fulcrumed adjacent one end on the exterior portion of said stud, a segmental gear separate from said lever loosely journaled upon said stud between the walls of said carrier, an extension projecting from the gear opposite the teeth, and a pin passing through a curved slot in the wall of said carrier and operatively connecting said gear extension to the shorter arm of said lever.

6. In a press for capping and corking bottles comprising a plunger, and means for reciprocating the same, of a capping die loosely secured to said plunger; said plunger and die being respectively provided with co-acting ball and socket elements whereby said capping die is adapted to conform itself squarely with the plane of the container to be capped.

7. In a press for capping and corking bottles comprising a plunger and means for reciprocating the same, of a capping die secured to said plunger and provided with diametrically opposite transverse bores, and a semi-circular spring having inturned ends adapted to enter said bores for retaining a cap within said die.

8. A machine of the kind described comprising a standard, a carrier mounted thereon, a plunger reciprocable in said carrier having a rack upon one edge, a gear meshing with said rack and having an extension, an operating lever separate from said gear having a portion extending beyond its fulcrum, means connecting the extensions of said lever and gear, and a latch engageable with the extension of said lever to lock the latter.

9. A machine of the kind described comprising a standard, a carrier mounted thereon, a plunger reciprocable in said carrier having a rack upon one edge, a stud extending through said carrier, a gear mounted upon said stud within said carrier, and meshing with said rack, an operating lever separate from said gear fulcrumed on said stud and having an extension beyond its fulcrum, a member projecting from said gear, a pin operatively connecting said member and the extension of said lever, and a latch engageable with the extension of said lever to lock the latter.

Signed at Chicago, county of Cook and State of Illinois.

ANDREW KRUS.